6263X
J. Barron,
Automatic Fan,
Patented Nov. 27, 1830.
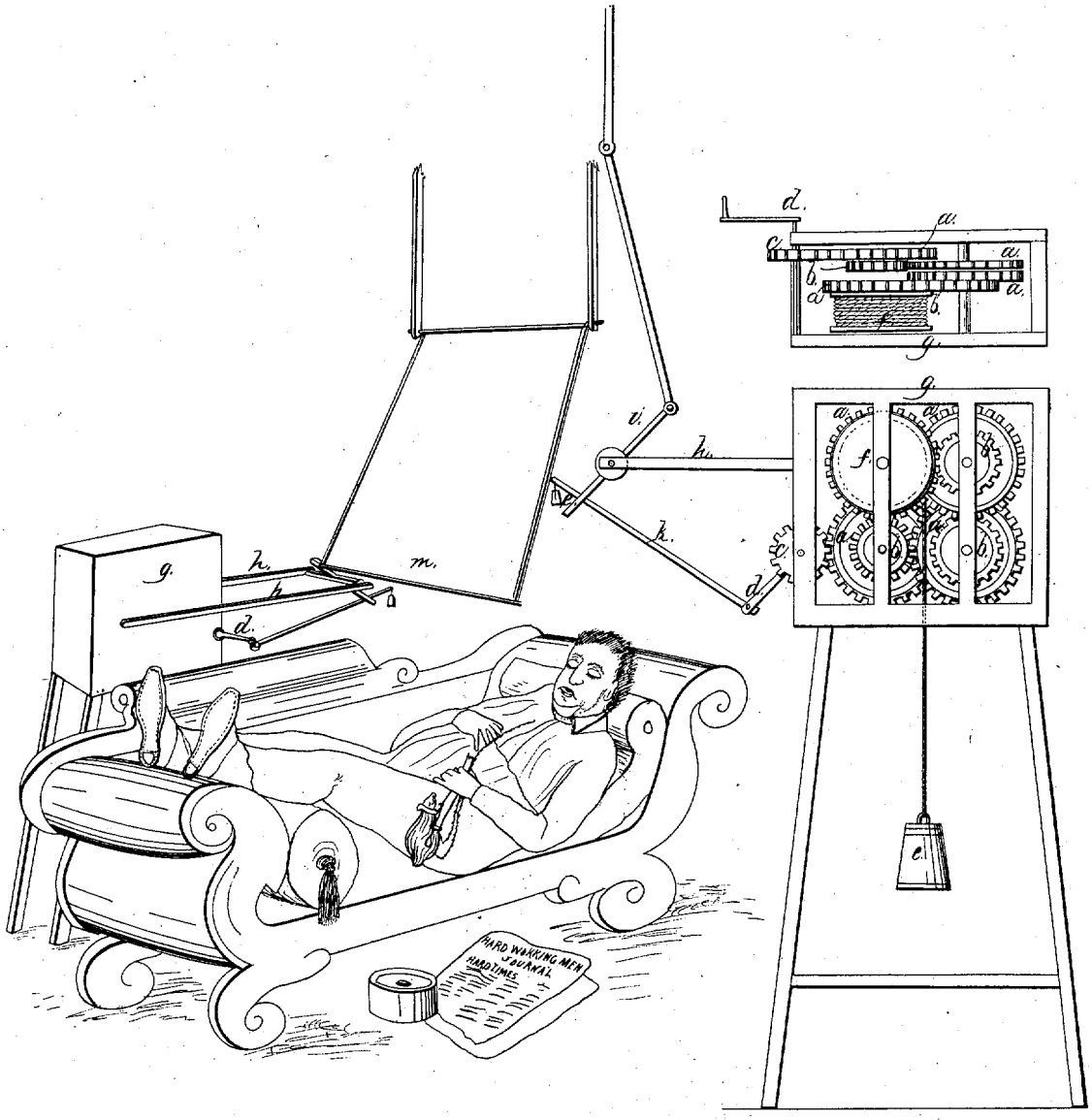
AM. PHOTO-LITHO. CO. N.Y. (OSBORNE'S PROCESS)

Nov 27. 1830

James Barron of Norfolk, Va.
Letters Patent X6263

The schedule referred to in these Letters Patent and making part of the same containing a description in the words of the said James Barron himself, of his improvement, being a Fan moved by mechanism, for bed chambers, dining rooms, halls &c.

---

Be it known that I James Barron of Norfolk, in the County of Norfolk, and State of Virginia, have made an improvement, being a fan moved by mechanism, for bed chambers, dining rooms, halls, &c. which is described as follows. This machine consists of four wheels and four pinions, either of metal or wood, or of wood & metal combined, and all connected Together, and operate in a regular uniform motion, agreeably to their respective situations; they may be united in their movements by bands of any kind, such as periphery chains, cords or leather bands; or, if metal wheels be preferred, they may be cogged to run into each other, or they may be driven by bands as above described. The four wheels and pinions are so placed in a frame of wood, as to stand, two, in a horizontal line, and the other two of those wheels over them, forming a square of wheels: to three of those wheels there is a pinion attached to each on the same axle, being three of the four pinions, the other pinion making the fourth, is placed on a crank in front of the first wheel, which receives its motion from the other wheels, all of which are driven by a weight attached to a cord wound round a barrel fixed on the axle of the last wheel, similar to those used in clocks. The wheels, pinions and axles are arranged in a convenient wooden frame, to the two sides of which Two strips of wood are attached, so as to project three or more feet in front of the wheels, as described in their square position; at the end of those projecting pieces there is attached on pivots a small axle, to which the upper part of the fan-staff is secured, and a few inches below that point there is a small mortise in the fan-staff through which another piece of wood called the driver passes, and is secured to it by a small pin. On the end of this driver is a small weight to balance it. The other end has a round hole made in it and attached to the crank

X6263 and receives its motion therefrom. The fan is attached at any convenie[illegible] dis-
tance over the bed, dining table &c; the whole of the machinery is then placed
on a light wooden frame of suitable height, and put at the side, or either [illegible]
of the bed or sofa, or in any other situation where it may be required. It is so
calculated as to run about eight hours; and can, by adding, or increasing
the size or the number of the wheels, be regulated for any period desired.
The improvement here claimed, and which is desired to be secured by
letters Patent, is the above described machine for fanning bed-chambers, dining
rooms, halls, &c.

Witness
Alexr. McIntyre
W. P. Elliot

James Barron

[illegible]

[illegible]